United States Patent [19]

Liao et al.

[11] Patent Number: 4,659,475

[45] Date of Patent: Apr. 21, 1987

[54] COMPOSITE REVERSE OSMOSIS MEMBRANE COMPRISING CROSSLINKED POLY(AMINE-EPIHALOHYDRIN ADDUCT)

[75] Inventors: Tsung K. Liao, Kansas City, Mo.; Cecil B. Chappelow, Leawood, Kans.

[73] Assignee: Midwest Research Institute, Kansas City, Mo.

[21] Appl. No.: 590,736

[22] Filed: Mar. 19, 1984

[51] Int. Cl.$^4$ .............................................. B01D 13/00
[52] U.S. Cl. ................................. 210/654; 210/500.37; 427/244
[58] Field of Search ............ 210/654, 490, 491, 500.2; 427/244, 245, 246

[56] References Cited

U.S. PATENT DOCUMENTS

| | | | |
|---|---|---|---|
| 3,551,244 | 12/1970 | Forester et al. | 156/246 |
| 3,567,632 | 3/1971 | Richter et al. | 210/23 |
| 3,600,350 | 8/1971 | Kwolek | 260/32.6 |
| 3,615,024 | 10/1971 | Michaels | 210/500.2 X |
| 3,642,663 | 2/1972 | Greer | 252/500 |
| 3,687,842 | 8/1972 | Credali et al. | 210/23 |
| 3,696,031 | 10/1972 | Credali et al. | 210/23 |
| 3,755,207 | 8/1973 | Karatsu | 260/2 A |
| 3,803,237 | 4/1974 | Ledwiear et al. | 268/584 R |
| 3,878,109 | 4/1975 | Ikeda et al. | 210/500 M |
| 3,904,519 | 9/1975 | McKinney, Jr. et al. | 210/23 |
| 3,926,798 | 12/1975 | Cadotte | 210/23 |
| 3,948,823 | 4/1976 | Lee et al. | 260/2.5 M |
| 3,951,789 | 4/1976 | Lee et al. | 210/22 C |
| 3,993,625 | 11/1976 | Kurihara et al. | 260/47 CP |
| 4,005,012 | 1/1977 | Wrasidlo | 210/500.2 X |
| 4,020,142 | 4/1977 | Davis et al. | 264/347 |
| 4,039,440 | 8/1977 | Cadotte | 210/23 H |
| 4,265,745 | 5/1981 | Kawaguchi et al. | 210/491 X |
| 4,387,024 | 6/1983 | Kurihara et al. | 210/500.2 X |
| 4,388,189 | 6/1983 | Kawaguchi et al. | 210/490 |
| 4,432,875 | 2/1984 | Wrasidlo et al. | 210/500.2 X |

OTHER PUBLICATIONS

Government Reports Announcements & Index; 79-5; PB-288 387/4GA.

S. Sourirajan; Reverse Osmosis and Synthetic Membranes; National Research Council of Canada (1977), Chap. 9, "Polyamide Membranes".

*Primary Examiner*—Frank Spear
*Attorney, Agent, or Firm*—Merchant, Gould, Smith, Edell, Welter & Schmidt

[57] ABSTRACT

A composite reverse osmosis membrane which can be used to separate a solvent, generally water, from solutes dissolved therein, can comprise a flexible microporous support with a thin film membrane comprising the condensation polymerization product of a polyfunctional crosslinking compound and a polymerized amine-epihalohydrin adduct.

27 Claims, No Drawings

COMPOSITE REVERSE OSMOSIS MEMBRANE COMPRISING CROSSLINKED POLY(AMINE-EPIHALOHYDRIN ADDUCT)

The government has rights in this invention pursuant to contract No. 14-34-0001-9449 awarded by the office of Water Research and Technology of the U.S. Department of Interior.

FIELD OF THE INVENTION

The invention relates to thin film membranes formed on a porous support and to their use and manufacture. More particularly the invention relates to a thin film membrane, formed on a porous support, which is the reaction product of a polymer, made by polymerizing an amine-epihalohydrin adduct and an amine or hydroxyl reactive polyfunctional carboxylic acid compound. The thin film membrane can be used in separation processes such as desalinization of sea water and in other processes.

BACKGROUND OF THE INVENTION

In recent years thin film semi-permeable membranes and separation processes using semi-permeable membranes, such as reverse osmosis, have attracted increasing attention in many fields where separation of materials from solvent is important. Reverse osmosis of semi-permeable membranes can be used in systems for the purification of water, to remove impurities from blood, in the concentration of dilute solutions of fine chemicals such as pharmaceuticals and in many other areas where energy conservation or the nature of the solute prohibits evaporative or distillation processes. Separation processes in which purified water is made from aqueous solutions of solutes, such as sea water, are of particular importance.

In performing reverse osmosis processes through thin, semi-permeable membranes, the aqueous solutions are commonly contacted with the semi-permeable membrane under superatmospheric pressure. In sharp contrast to osmotic processes, substantially purified water passes through the membrane, leaving solute molecules or other impurities in the comparatively concentrated aqueous solution retained by the membrane. A basic discussion of such reverse osmosis treatment is set forth in the treatise "Desalinization by Reverse Osmosis," MTIS Press, 1966, edited by Ulrich Merten, which is expressly incorporated by reference herein.

In semi-permeable membrane reverse osmosis processes, two characteristics are most important. First, the membrane must have a substantial through-put or flux of water to operate efficiently. Secondly, the membrane must reject essentially all solute. Many solutes are particularly toxic, harmful, undesirable, or particularly expensive and their transmittal across the membrane in any substantial concentration can result in the separation being of little value. Accordingly, preferred membranes have high flux or through-put of substantially pure water while rejecting substantial quantities of solute. In desalinization processes a membrane that can achieve a flux of about 9 gallons or greater per square foot of the membrane per day (gfd), preferably 15 gfd or greater, and a salt rejection of 90%, preferably about 95% or greater, can be considered a successful membrane.

The earliest useful semi-permeable membranes which were applied commercially include the Loeb-type membranes made of cellulose diacetate by the processes described in U.S. Pat. Nos. 3,133,132 and 3,133,137. Loeb-type membranes comprise an asymmetric membrane characterized by a thin, dense surface layer or skin supported on an integrally attached, thick porous support layer. Other types of reverse osmosis membranes and methods of preparation have been described in, for example, U.S. Pat. No. 3,246,764, disclosing porous glass fibers coated with polyphosphine oxide, cellulose acetate, or polystyrene. U.S. Pat. No. 3,310,488 discloses a cellulose acetate coated asymmetric membrane. U.S. Pat. No. 3,556,992 discloses an inorganic or organic gel layer on a porous support film. U.S. Pat. No. 3,567,632 discloses asymmetric membranes made from aromatic polyamides. Many of the prior art membranes have been shown to have insufficient through-put or flux, to have insufficient salt rejection, to be subject to chemical or biological degradation, or to have other drawbacks.

One class of polymers which has been identified for in-depth investigation in view of the applicability of the class of polymers to the preparation of specialized barrier materials for use in hostile environments, are polyamide polymers. A discussion of the background, fabrication, properties, and use of polyamide membranes is set forth in Chapter 9, pages 167–210 of "Reverse Osmosis and Synthetic Membranes," National Resource Council of Canada (1977) which is expressly incorporated by reference herein. Semi-permeable membranes have been made by forming thin film barriers from di- and trifunctional aromatic and aliphatic carboxylic acid compounds, isocyanates, aldehydes, etc., and amines such as diaminobenzene, piperazine, hydrazine, and many others. One drawback of certain polyamide-type membrane compositions involves the amine used in forming the membrane. Often the primary amines used in forming the polyamide polymer result in the polymer having proton substituted amido groups. This proton tends to be labile and easily removed under oxidizing conditions, resulting in a deterioration of the amide polymer beginning at the amido group, which can ultimately result in the deterioration of the properties of the thin film membrane.

Wrasidlo, U.S. Pat. No. 4,005,012, teaches one specific type of polyamide membrane. The Wrasidlo semi-permeable membranes comprise an ultra-thin film formed on a support, comprising the reaction product of an amine modified polyepihalohydrin polymer and a polyfunctional carboxylic acid compound which is capable of reacting with the amine groups of the amine modified polyepihalohydrin. The structure of the resulting polyamide structure is shown in Wrasidlo at column 3, lines 28–52, wherein it appears that the polyfunctional acid compound crosslinks the amine modified polyepihalohydrin polymer through the pendent amine groups. It is clear from the formulas that the amino compounds are not part of the polymer backbone, that the polymer backbone is a homopolymer of an epihalohydrin, and that proton-substituted amine groups which can be subject to oxidative attack and membrane deterioration can be present. Accordingly, a substantial need exists for amine compounds which can be used in forming asymmetric thin film membranes having high solvent flux, low solute rejection, and resistance to oxidative deterioration in the presence of oxidants such as chlorine.

BRIEF DISCUSSION OF THE INVENTION

We have discovered that semi-permeable membranes having high solvent flux, high solute rejection, and stability can be formed by first forming a polymer having repeating units of an amine-epihalohydrin adduct, and reacting the polymer with a polyfunctional compound to form the membrane. A first aspect of the invention is a thin film membrane formed on a porous support. A second aspect of the invention is a method for performing reverse osmosis separation using the novel thin film membranes of the invention. A third aspect of the invention is a method for forming the thin film membranes of the invention. A further aspect of the invention is a cartridge containing a semi-permeable membrane adapted for use in commercial reverse osmosis equipment.

This invention was made with the support of the U.S. Government under Government Contract DOI 14-34-0001-9449 awarded by the Department of the Interior. The U.S. Government has certain rights in the invention.

DETAILED DESCRIPTION OF THE INVENTION

Briefly, the thin film membranes of this invention can be made by forming and polymerizing an adduct of a polyamine and an epihalohydrin, treating a porous substrate with a solution of the polymerized adduct, contacting the resulting substrate containing the polymerized adduct with a solution of a polyfunctional compound causing a reaction with the amine groups or the hydroxyl groups of the polymer to form the thin film membrane, and drying the composite structure.

Polyamines useful for forming the polyamine-epihalohydrin adduct include amines which have two or more primary or secondary amine groups, each separated by at least two carbon atoms. Specific examples of such amines include ethylenediamine, diaminopropane, diaminobutane, diethylenetriamine, dibutylenetriamine, triethylenetetraamine, tripropylenetetraamine, tetraethylenepentamine, pentaethylenehexamine, isomers of diaminocyclobutane, diaminocyclopentane, diaminocyclohexane, etc.; isomers of diaminofuran, diaminopyridine, phenylenediamine; 1,4-bisaminomethylcyclohexane, 2,5-diamino-2-hydroxybenzoic acid, 3,5-diamino-2-hydroxycyclohexane carboxylic acid, N,N'-bis(2-aminoethyl)piperazine, piperazine, etc.

A preferred class of polyamines for use in preparing the adduct of the invention comprises the compounds of the following formula:

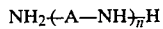

wherein A is a $C_{6-18}$ arylene group or a $C_{2-6}$ alkylene group.

Included in these compounds are ethylenediamine, diethylenetriamine, triethylenetetraamine, tetraethylenepentamine, 1,3-diaminocyclohexane, paraphenylenediamine, etc.

A most preferred class of polyamines for preparing the adduct of the invention comprises the hydroxy-substituted alkylene polyamines of the following formula:

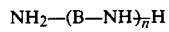

wherein B is

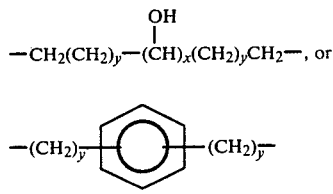

and n, x and y are independently an integer selected from 0 to 6, and $n+x+y$ is greater than or equal to 2. Examples of suitable hydroxy-substituted polyamines are 1,3-amino-2-hydroxypropane, 1,4-diamino-2-hydroxybutane, 1,4-diamino-6-hydroxyhexane, 1,4-diamino-2-hydroxycyclohexane, bis(2-hydroxy-3-aminopropyl)amine, 1,3-diamino-2-hydroxybenzene, N-(2-hydroxy-3-aminopropyl)-2-hydroxy, 1,3-diaminopropane, etc.

Epihalohydrins which can be used to form the polymerizable adduct with the above described polyamines include compounds having a hetero oxygen containing reactive ring structure and a reactive group which after a ring opening reaction with the amine compound can cause the polymerization of the adduct. The epihalohydrins of this invention have the following general formula

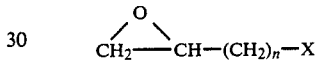

wherein X is halogen and n is an integer of 1 to 6. Specific examples of suitable compounds include epihalohydrin compounds such as 4-chloro-1,2-epoxy-butane, 4-chloro-2,3-epoxy-butane, 5-chloro-1,2-epoxy-pentane, 5-chloro-2,3-epoxy-pentane, 4-bromo-1,2-epoxy-butane, etc. The preferred epihalohydrin compounds are epichlorohydrin compounds such as 3-chloro-1,2-epoxy-propane, 4-chloro-1,2-epoxy-butane, 4-chloro-2,3-epoxy-butane, and mixtures thereof. For reasons of reactivity, ease of use, and economy, the most preferred epichlorohydrin compound is 3-chloro-1,2-epoxy-propane.

The polyamine-epihalohydrin adduct is commonly formed by reacting the components at approximately equimolar proportions according to the following generalized reaction:

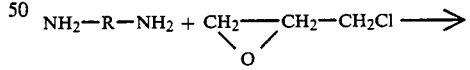

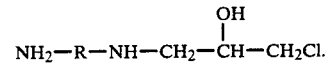

The reaction is believed to proceed with an epoxide ring opening caused by the reaction of one of the polyamine amino nitrogen atoms. Under certain reaction conditions the reaction can be terminated with the formation of the adduct, however, preferably the reaction conditions are adjusted such that the adduct polymerizes according to the following polymerization reaction:

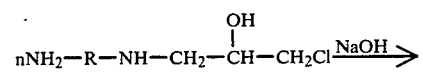

-continued

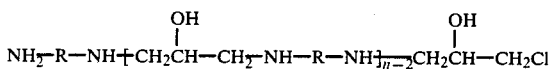

wherein the chlorine atom in the adduct is nucleophilically displaced by an amino group of another adduct molecule while sodium hydroxide acts as an acceptor for the generated chlorine ion. The polymers thus formed clearly have residues in the polymeric chain derived from both the amine compound and the epihalohydrin compound. It appears that the polymeric compound does not have a substantially polyepihalohydrin backbone with pendant amino groups, but is a true alternating copolymer-type molecule.

The epihalohydrin-polyamine polymer formed above is generally made by reacting, in a suitable solvent, at ambient or slightly elevated temperatures approximately equimolar amounts of the polyamine and the epihalohydrin compound. The reaction can be performed in any solvent which can solubilize the reactants. A preferred solvent system includes lower alcohols and other hydroxyl containing solvents such as methanol, ethanol, propanol, tertiary butanol, cyclohexanol, ethylene glycol, propylene glycol, and the common cellosolves and carbitol solvents. The reaction between the amine and the epihalohydrin compound needs no catalyst. After the reaction is complete, a time period from about 1 to about 20 hours, the amine epichlorohydrin adduct is polymerized using a basic catalyst that can cause the amino group to nucleophilically attack the chloromethylene substituent initiating the polymerization reaction. Common alkaline bases can be used to initiate polymerization, however preferred basic catalysts are those which result in a filterable reaction product when the polymerization is terminated. Accordingly, for reasons of cost, high catalytic activity, and ease of use, sodium hydroxide is preferred. After the polymerization is complete and any solids formed in the reaction is filtered from the solution, the reaction solvent can be separated from the reaction product using convenient means such as evaporation or dialysis. The polymerized adduct is commonly a colorless, viscous liquid product characteristic of polyamide oils. Preferably reaction conditions are modified in such a way to maximize the yield of water soluble polymerized adduct. The polymerized adduct can be used in aqueous solution at a concentration of about 1-10 wt-%, preferably 5 wt-%.

The membranes of the invention are formed by reacting a polyfunctional compound which can crosslink the polymerized polyamine-epihalohydrin adduct generally through the amine or the hydroxyl groups. Examples of polyfunctional crosslinking agents which may be employed to form the membranes of the invention include di, tri and tetra-substituted carboxylic acid compounds, aliphatic and aromatic diisocyanates, polyfunctional chloroformates, and polyfunctional sulfonyl chlorides, etc. Preferred polyfunctional compounds include amine or hydroxyl reactive saturated and unsaturated polyfunctional carboxylic acid compounds, having about 4 to 50 carbon atoms. Reactive polyfunctional carboxylic acid compounds include carboxylic acid anhydrides, carboxylic acid halides, percarboxylic acids, etc. Most preferred polyfunctional compounds include the di- and tri-functional aromatic carboxylic acid anhydrides and acid halides having the formulae:

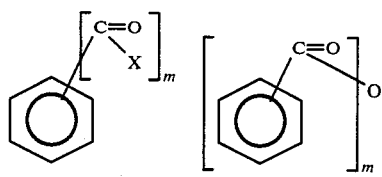

wherein X is a halogen such as chloro or bromo and m is an integer of 1-4. Specific examples of useful compounds include phthalic anhydride, isophthaloyl chloride, terephthaloyl chloride, trimesoyl chloride, 1,2-3,4-benzene-tetracarboxylic acid dianhydride, etc.

While we do not wish to be held to a theory of action of the polymeric membranes of the invention, we believe the structure of one embodiment of the preferred membranes corresponds to the formula:

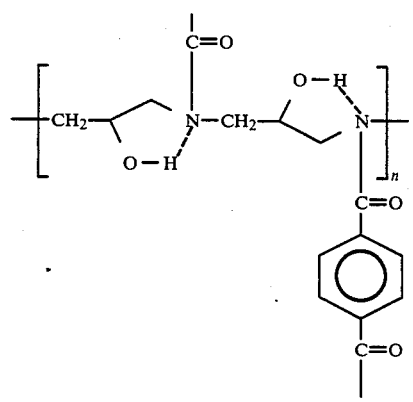

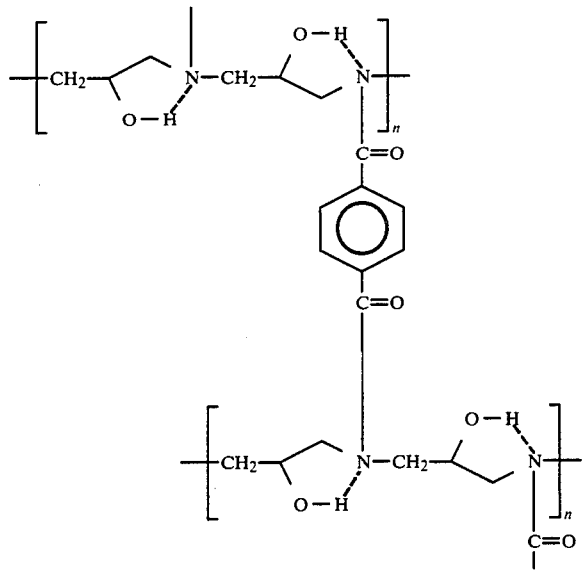

wherein the dotted lines indicate intramolecular hydrogen bonds, and n is an integer of 10-20. The amino nitrogens are fully substituted through the reactions forming the adduct and the crosslinked membrane. Further the amino groups appear to form hydrogen bonds with the hydroxyl from the hydroxyl-substituted polyamine. The fully substituted amine nitrogens are unavailable for reaction with compounds that can cause oxidative degradation.

We have also found that the flux and salt rejection of the membranes of this invention can be improved if the membranes are prepared in the presence of an inorganic salt or an organic surfactant compound or mixtures thereof. Inorganic salt compounds that can be used in the manufacture of the membranes of this invention include salts which are at least partially water soluble and which are made from common cations such as sodium, potassium, lithium, calcium, magnesium, zinc, aluminum, etc. The cations of the inorganic salt compounds are generally derived from common inorganic acids, such as sulfate, phosphate ($PO_4$, $HPO_4$, $H_2PO_4$), carbonate ($CO_3$, $HCO_3$), chloride, bromide, thiosulfate, etc. Preferred inorganic salts for use in this invention include sodium carbonate, sodium sulfate, disodium phosphate ($Na_2HPO_4$, $NaH_2PO_4$), etc. The most preferred inorganic salt for the membranes of this invention is trisodium phosphate ($Na_3PO_4.12H_2O$).

The inorganic salts can be added to the aqueous solution of the polymerized adduct before polymerization is conducted. Commonly the inorganic salt compound is present at a concentration of about 0.01 to about 10 wt-%, preferably at a concentration of about 0.1 to 5 wt-%, and most preferably for reasons of membrane performance, at a concentration of about 1 to 3 wt-%.

We have further found that the properties of the semi-permeable membranes of this invention can be improved if the membranes are formed in the presence of a small but effective amount of a surfactant. Cationic, anionic, nonionic, and amphoteric surfactants can be used. The surfactant classes are well known and large numbers of each class of surfactant are well known to persons skilled in the art. The preferred class of surfactants comprise anionic surfactants such as organic sulfates and sulfonates, organic phosphates and phosphonates, polyaminocarboxylic acids, polyelectrolytes, organic succinates, organic taurates, etc. Preferred surfactants are the organic sulfonates such as the linear alkyl sulfonates or linear alkyl benzene sulfonates.

The thin film semi-permeable membranes can be formed on a suitable substrate or support comprising a porous or microporous sheet having sufficient mechanical strength to support a reverse osmosis process. The porous or microporous substrate can have pores sized between 50 and 5,000 angstroms and greater. The substrate may be selected from various commercially available materials such as millipore filters, substrates cast from homopolymers, or mixed polymers of cellulose acetate, cellulose nitrate, cellulose butyrate, polysulfone, polystyrene, etc. The preferred porous support for reasons of cost, ease of use and availability are polysulfone supports. The preparation and properties of the support materials and their use in forming thin film semi-permeable membranes are well known in the art.

In somewhat greater detail, the semi-permeable membranes of the invention are made by reacting the polymerized adduct and the polyfunctional agent on the microporous support. The polymerized adduct is commonly applied to the porous support in the form of a solution of the adduct wherein the adduct is at a concentration of from about 0.1 to about 10 wt-% of the adduct in an appropriate solvent. Preferably, the adduct is applied to the support in an aqueous solution at a concentration of about 1 to about 8 wt-%. Generally, the microporous support is saturated with the solution of the polymerized adduct. Care is generally taken so that the support does not contain excess solution. The support can be placed on an absorbent material to absorb excess solution or can be compressed to expel excess solution using common compression means such as a solid rubber roller. The microporous support now saturated with an appropriate amount of the polymerized adduct solution is contacted with the polyfunctional crosslinking agent at an appropriate concentration in a suitable solvent for reaction with the polymerized adduct to form the membrane on the support.

Commonly the crosslinking agent is present in solution at concentrations of from about 0.1 to about 10 wt-%, preferably about 0.5 to 7 wt-%, and most preferably for reasons of ease of reaction and membrane performance, about 1 to about 4 wt-%. The preferred polyfunctional aromatic carboxylic acid compounds are used in solvents such as hexane, benzene, ether solvents, etc. The saturated microporous support is contacted with the solution of the crosslinking agent for a sufficient period to insure that the thus-formed membrane is fully formed without void spaces and does not become so thick that the solvent flux is unacceptably low. Commonly the preferred polymerized adduct is reacted with the preferred polyfunctional aromatic carboxylic acid compounds for a time period of about 1 to about 60 seconds, preferably from about 1 to about 45 seconds, and most preferably for reasons of membrane performance, about 5 to about 20 seconds.

After the reaction is complete the membrane and support are dried at room temperature to substantially remove the reaction solvent and then dried at elevated temperature (about 100° C. or greater) for a sufficient period of time to remove water or other volatiles. Care must be taken during the drying step that pin hole void spaces not be introduced into the membrane by handling the membrane roughly or drying the membrane under too severe conditions. After the membrane is fully dried the membrane is preserved in deionized water until it is used.

During membrane formation, the solution of the polyfunctional carboxylic acid compound is reacted with the saturated microporous support at a ratio of carboxylic groups in the polyfunctional crosslinking agent to amino groups in the polymerized adduct of about 4 to 0.2, preferably about 3 to 0.3, and most preferably for reasons of membrane performance, about 2 to 0.5.

In the event that the polyfunctional carboxylic acid compound comprises a polyfunctional carboxylic acid halide, the reaction is commonly performed in the presence of an acid acceptor in the reaction media. The acceptor can be added in the solution of the polymerized adduct or can be included in the solution of the polyfunctional carboxylic acid compound. The acid acceptor is present in the reaction mixture in order to neutralize hydrogen halide generated during the reaction between the polyfunctional acid halide and the polymerized adduct. The acid acceptors are well known and can be both organic and inorganic compounds that can react with hydrogen halides producing generally non-reactive neutral species. Examples of commonly used acid acceptors include pyridine, ethylamine, ethylenediamine, sodium carbonate, sodium hydroxide, sodium bicarbonate, and others. The finished semi-permeable membranes can be coated with a protective ultrathin film of a water soluble organic polymer.

An alternate method for preparing the semi-permeable membranes of this invention involves the in-situ preparation of the polyamine epichlorohydrin adduct in the support membrane and its subsequent polymerization and crosslinking. In this process the in-situ preparation of the adduct is made by contacting the support membrane with freshly prepared solutions of the polyamine and the epihalohydrin in a suitable alcoholic or aqueous alcoholic solvent until the membrane contains sufficient reactants to permit the formation of a functional membrane. The membrane with polyamine and epihalohydrin is treated with dilute base, preferably sodium hydroxide to promote the adduct formation and its subsequent polymerization. Typically the support film is contacted with approximately equimolar amounts of polyamine and epihalohydrin. The reaction time for the in situ preparation of the polymerized polyamine epihalohydrin adduct depends on the specific amine and epihalohydrin selected. However, since long reaction times promote the formation of water insoluble, high molecular weight polymers, the reaction times should be adjusted to promote formation of adduct polymers having about 10 to 20 repeating units.

After the successful in-situ formation of the polymer adduct, it can be crosslinked as described above.

In a preferred mode, the polysulfone support film can be impregnated at high speed, centrifugally, with a methanolic solution of 1,3-diamino-2-hydroxypropane followed by a solution of epichlorohydrin and methanol. The resulting impregnated sulfone film is maintained in a methanol vapor saturated chamber at room temperature for 1 to 2 hours to insure completion of the reaction forming the corresponding adduct. The adduct saturated support is subsequently treated with dilute aqueous sodium hydroxide, centrifugally, and maintained in a water vapor saturated chamber for up to 2 hours to insure polymerization of the adduct but avoiding the formation of water insoluble, high molecular weight polymerized adduct. At the end of the polymerization time the film containing the polymerized adduct is immersed in a solution of terephthaloyl, isophthaloyl chloride or mixtures thereof in a compatible solvent for a period of time from about 1 to about 30 seconds in order to crosslink the polymerized adduct. After the reaction is complete, the support film is dried at 150° F., rinsed with water and stored in an aqueous medium.

The membranes of this invention can be prepared and stored in a preservative solution and can be used as is, or preferably can be used in the form of a replaceable cartridge adapted for use in reverse osmosis apparatus. The replaceable cartridge can have means for attaching the cartridge to the reverse osmosis apparatus in a manner that the membrane can be contacted with the solution to be treated under high pressure. The cartridges are commonly constructed in such a way that a large surface area of the membrane is included within a cartridge having a convenient size and easily handled dimensions. Commonly the semi-permeable membranes are arranged within the cartridge in a concentric fashion in such a way that the solution to be treated is contacted under pressure to one side of the membrane and that other side of the membrane, through which the purified water passes, is isolated from the treated solution. Cartridges of this sort are well known in the art.

In order to provide further information by which the invention may be understood, the following non-limiting examples are presented which contain a best mode.

POLYMERIZED ADDUCT

Example I

Into a 500 milliliter three-necked round bottom flask equipped with a dropping funnel, a condenser, a thermometer, and a mechanical stirrer was placed a solution of 9.0 grams (0.1 moles) of 1,3-diamino-2-hydroxypropane in 50 milliliters of methanol. Into the dropping funnel, at 25° C., was placed a solution of 9.2 grams (0.1 moles) of 3-chloro-1,2-epoxypropane dissolved in 50 milliliters of methanol. The solution in the dropping funnel was added drop-wise over a period of 10 to 15 minutes. The reaction between the epoxy compound and the diamine was permitted to continue at ambient with stirring for about 2 hours. At the end of the reaction period, into the resulting solution of the adduct was added dropwise over an hour a solution of 4.0 grams (0.1 moles) of sodium hydroxide dissolved in 50 milliliters of methanol, in order to polymerize the adduct. During the polymerization reaction, insoluble sodium chloride was formed and precipitated. At the end of 1 hour, the reaction mixture was filtered to remove sodium chloride and was evaporated at 50° C. under reduced pressure in a flash evaporator, yielding a colorless, viscous liquid product. The product was stirred at room temperature in 100 milliliters of deionized water overnight, during which about 15% of the product dissolved in the water leaving an insoluble fraction. The aqueous solution of the polymerized adduct was filtered to remove the water insoluble fraction of the polymerized adduct.

Example II

Example I was repeated except that the reaction time between the epoxy compound and the amine was 20 hours instead of 2 hours.

Example III

Example I was repeated except that the polymerization reaction time was 4 hours instead of 1 hour.

Example IV

Example II was repeated except that the polymerization reaction time was 4 hours instead of 1 hour.

MEMBRANE

Example V

In a 100 ml petri dish containing 25 milliliters of an aqueous solution containing a 1 wt-% of the polymerized adduct of Example I and 1 wt-% of NaOH, was placed a 3 inch diameter disc of the polysulfone support film of Example XXV. The support film was soaked for 5 minutes until saturated with the solution. The overly saturated polysulfone film was removed from the solution and was pressed with a soft rubber roller to remove excess solution. In order to form the membrane, the saturated support was then immediately immersed in 15 milliliters of a 1 wt-% solution in hexane of isophthaloyl chloride for 15 seconds. The support with the intact membrane was permitted to drain and was then dried at room temperature for about 10 minutes and then dried at 115° C. for 15 minutes. The dried membrane was permitted to cool and then stored in deionized water.

Example VI

Example V was repeated except that a solution of 0.85 wt-% of isophthaloyl chloride and 0.15 wt-% of trimesoyl chloride in hexane was used in place of the 1 wt-% solution of isophthaloyl chloride in hexane.

Example VII

Example V was repeated except that a 3 wt-% aqueous solution of the product of Example I was used in place of the 1 wt-% aqueous solution of the product of Example I.

Example VIII

Example VII was repeated except that a solution of 0.85 wt-% isophthaloyl chloride and 0.15 wt-% trimesoyl chloride in hexane was used in place of the 1 wt-% hexane solution of isophthaloyl chloride.

Example IX

Example V was repeated except that the polymerized adduct of Example II was used in place of that of Example I.

Example X

Example XVI was repeated except that the polymerized adduct of Example II was used in place of that of Example I.

Example XI

Example VII was repeated except that the polymerized adduct of Example II was used in place of that of Example I.

Example XII

Example VIII was repeated except that the polymerized adduct of Example II was used in place of that of Example I.

Example XIII

Example V was repeated except that the polymerized adduct of Example III was used in place of that of Example I.

Example XIV

Example VI was repeated except that the polymerized adduct of Example III was used in place of that of Example I.

Example XV

Example VII was repeated except that the polymerized adduct of Example III was used in place of that of Example I.

Example XVI

Example VIII was repeated except that the polymerized adduct of Example III was used in place of that of Example I.

Example XVII

Example V was repeated except that the polymerized adduct of Example IV was used in place of that of Example I.

Example XVIII

Example VI was repeated except that the polymerized adduct of Example IV was used in place of that of Example I.

Example XIX

Example VII was repeated except that the polymerized adduct of Example IV was used in place of that of Example I.

EXAMPLE XX

Example VIII was repeated except that the polymerized adduct of Example IV was used in place of that of Example I.

Example XXI

Into a 500 milliliter three-necked round bottom flask equipped with a dropping funnel, a condenser, and a mechanical stirrer was placed a solution of 9.0 grams (0.1 moles) of 1,3-diamino-2-hydroxypropane in 50 milliliters of methanol. Into the methanol solution, at 25° C., was slowly added under stirring a solution of 9.2 grams (0.1 moles) of 3-chloro-1,2-epoxypropane dissolved in 50 milliliters of methanol. The reaction between the epoxy compound and the diamine was permitted to continue at ambient with stirring for about 20.0 hours. At the end of the reaction period, into the resulting solution of the adduct was added drop-wise with stirring over one hour a solution of 4.0 grams (0.1 moles) of sodium hydroxide dissolved in 50 milliliters of methanol in order to polymerize the adduct. During the polymerization reaction, insoluble sodium chloride was formed and precipitated. At the end of the polymerization reaction, about one hour, the reaction mixture was filtered to remove sodium chloride and was evaporated at 50° C. under reduced pressure in a flash evaporator, yielding a colorless, viscous liquid product. The product was stirred at room temperature in 100 milliliters of deionized water overnight, during which about 10% of the product dissolved in water leaving an insoluble residue. The aqueous solution of the polymerized adduct was filtered to remove the insoluble portion of the polymerized adduct.

In a 100 mL petri dish containing 25 milliliters of an aqueous solution containing 2.5 wt-% of the polymerized adduct, 2 wt-% of sodium phosphate ($Na_2PO_4 \cdot H_2O$) and 0.5 wt-% of sodium lauryl sulfonate, was placed a 3-inch diameter disc of the polysulfone support film of Example XXV. The support film was soaked for 5 minutes until saturated with the solution. The overly saturated polysulfone film was removed from the solution and was pressed with a soft rubber roller to remove excess solution. In order to form the membrane the saturated support was then immediately immersed in 15 milliliters of a 1 wt-% solution in hexane of isophthaloyl chloride for 15 seconds. The support with the intact membrane was permitted to drain and was then dried at room temperature for about 10 minutes and then dried at 115° C. for 15 minutes. The dried membrane was permitted to cool and then stored in deionized water.

Example XXII

Into a 500 milliliter three-necked flask equipped with a mechanical stirrer, a condenser and a dropping funnel was placed a solution of 9.0 grams (0.1 moles) of 1,3-diamino-2-hydroxypropane in 50 milliliters of methanol. Into the methanol solution, at 25° C., was slowly added under stirring a solution of 9.2 grams (0.1 moles) of 3-chloro-1,2-epoxypropane dissolved in 50 milliliters of methanol. The reaction between the epoxy compound and the diamine was permitted to continue at ambient with stirring for about 20.0 hours. At the end of the reaction period, into the resulting solution of the adduct was added drop-wise with stirring over one hour a solution of 4.0 grams (0.1 moles) of sodium hydroxide dissolved in 50 milliliters of methanol in order to polymerize the adduct. During the polymerization reaction, insoluble sodium chloride was formed and precipitated. At the end of the polymerization reaction, about one hour, the reaction mixture was filtered to remove sodium chloride and was evaporated at 50° C. under reduced pressure in a flash evaporator, yielding a colorless, viscous liquid product. The product was stirred at room temperature in 100 milliliters of deionized water overnight, during which about 15% of the product dissolved in water leaving an insoluble residue. The aqueous solution of the polymerized adduct was filtered to remove the insoluble portion of the polymerized adduct.

In a 100 mL petri dish containing 25 milliliters of an aqueous solution containing 3.0 wt-% of the polymerized adduct, 2 wt-% of sodium phosphate ($Na_2PO_4 \cdot H_2O$) and 0.1 wt-% of piperazine, was placed a 3-inch diameter disc of the polysulfone support film of Example XXV. The support film was soaked for 5 minutes until saturated with the solution. The overly saturated polysulfone film was removed from the solution and was pressed with a soft rubber roller to remove excess solution. In order to form the membrane the saturated support was then immediately immersed in 15 milliliters of a 1 wt-% solution in hexane of isophthaloyl chloride for 15 seconds. The support with the intact membrane was permitted to drain and was then dried at room temperature for about 10 minutes and then dried at 115° C. for 15 minutes. The dried membrane was permitted to cool and then stored in deionized water.

Example XXIII

Into a 500 milliliter three-necked flask equipped with a mechanical stirrer, a condenser and a dropping funnel was placed a solution of 9.0 grams (0.1 moles) of 1,3-diamino-2-hydroxypropane in 50 milliliters of methanol. Into the methanol solution, at 25° C., was slowly added under stirring a solution of 9.2 grams (0.1 moles) of 3-chloro-1,2-epoxypropane dissolved in 50 milliliters of methanol. The reaction between the epoxy compound and the diamine was permitted to continue at ambient with stirring for about 20.0 hours. At the end of the reaction period, into the resulting solution of the adduct was added drop-wise with stirring over one hour a solution of 4.0 grams (0.1 moles) of sodium hydroxide dissolved in 50 milliliters of methanol in order to polymerize the adduct. During the polymerization reaction, insoluble sodium chloride was formed and precipitated. At the end of the polymerization reaction, about one hour, the reaction mixture was filtered to remove sodium chloride and was evaporated at 50° C. under reduced pressure in a flash evaporator, yielding a colorless, viscous liquid product. The product was stirred at room temperature in 100 milliliters of deionized water overnight, during which about 10% of the product dissolved in water leaving an insoluble residue. The aqueous solution of the polymerized adduct was filtered to remove the insoluble portion of the polymerized adduct.

In a 100 mL petri dish containing 25 milliliters of an aqueous solution containing 3.0 wt-% of the polymerized adduct, 1.0 wt-% of piperazine and 0.5 wt-% of sodium lauryl sulfonate, was placed a 3-inch diameter disc of the polysulfone support film of Example XXV. The support film was soaked for 5 minutes until saturated with the solution. The overly saturated polysulfone film was removed from the solution and was pressed with a soft rubber roller to remove excess solution. In order to form the membrane the saturated support was then immediately immersed in 15 milliliters of a 1 wt-% solution in hexane of isophthaloyl chloride for 15 seconds. The support with the intact membrane was permitted to drain and was then dried at room temperature for about 10 minutes and then dried at 115° C. for 15 minutes. The dried membrane was permitted to cool and then stored in deionized water.

Example XXIV

Into a 500 milliliter three-necked flask equipped with a mechanical stirrer, a condenser and a dropping funnel was placed a solution of 9.0 grams (0.1 moles) of 1,3-diamino-2-hydroxypropane in 50 milliliters of methanol. Into the methanol solution, at 25° C., was slowly added under stirring a solution of 9.2 grams (0.1 moles) of 3-chloro-1,2-epoxypropane dissolved in 50 milliliters of methanol. The reaction between the epoxy compound and the diamine was permitted to continue at ambient with stirring for about 20 hours. At the end of the reaction period, into the resulting solution of the adduct was added drop-wise with stirring over one hour a solution of 4.0 grams (0.1 moles) of sodium hydroxide dissolved in 50 milliliters of methanol in order to polymerize the adduct. During the polymerization reaction, insoluble sodium chloride was formed and precipitated. At the end of the polymerization reaction, about one hour, the reaction mixture was filtered to remove sodium chloride and was evaporated at 50° C. under reduced pressure in a flash evaporator, yielding a colorless, viscous liquid product. The product was stirred at room temperature in 100 milliliters of deionized water overnight, during which about 12% of the product dissolved in water leaving an insoluble residue. The aqueous solution of the polymerized adduct was filtered to remove the insoluble portion of the polymerized adduct.

In a 100 mL petri dish containing 25 milliliters of an aqueous solution containing 0.5 wt-% of the polymerized adduct, 0.5 wt-% of piperazine and 0.5 wt-% of sodium lauryl sulfonate, was placed a 3-inch diameter disc of the polysulfone support film of Example XXV. The support film was soaked for 5 minutes until saturated with the solution. The overly saturated polysulfone film was removed from the solution and was pressed with a soft rubber roller to remove excess solution. In order to form the membrane the saturated support was then immediately immersed in 15 milliliters of a 1 wt-% solution in hexane of isophthaloyl chloride for 15 seconds. The support with the intact membrane was permitted to drain and was then dried at room temperature for about 10 minutes and then dried at 115° C. for 15 minutes. The dried membrane was permitted to cool and then stored in deionized water.

Example XXV

Example I was repeated except that the reaction between the amine and the epoxy compound was conducted at 70° C. for 6 hours.

Example XXVI

Example V was repeated except that the polymerized adduct of Example XXV was used in place of that of Example I.

Example XXVII

Example VII was repeated except that the polymerized adduct of Example XV was used in place of that of Example I.

POLYSULFONE SUPPORT

Example XXVIII

Into a 500 milliliter beaker equipped with a magnetic stirrer and stirrer bar containing 170 grams of dimethylformamide was added 30 grams of polysulfone resin (Union Carbide UDEL polysulfone P3500 natural II). After addition was complete the mixture was heated to 100° C. until a clear solution was obtained. About 20 milliliters of the cooled clear solution was applied to a 20 by 60 millimeter glass plate and the thickness of the solution was adjusted to 7 mils with a doctor blade. The glass plate was quickly immersed in deionized water containing 2 wt-% dimethylformamide and 0.5 wt-% sodium dodecyl-sulfate at ambient temperature (24° C.). The film rapidly gelled and floated free from the glass plate. The film was removed from the gelling solution and was stored in deionized water until the membranes were formed on the film. The membranes were generally formed on the top or glossy side of the polysulfone support.

TESTING

The resulting composite membranes were tested for flux and solute rejection in a flat reverse osmosis cell for 24 hours using 3.5 wt-% synthetic sea water feed solution at 68 atmosphere and 25° C. The synthetic sea water salts had the following composition:

| Dry Salts | |
|---|---|
| NaCl | 27,553.0000 mg |
| $MgCl_2 \cdot 6H_2O$ | 5,800.0000 mg |
| $MgSO_4$ | 6,921.0000 mg |
| $CaCl_2$ | 1,379.6000 mg |
| KCL | 733.9000 mg |
| $NaHCO_3$ | 209.7000 mg |
| $SrCl_2 \cdot 6H_2O$ | 19.8130 mg |
| $MnSO_4 H_2O$ | 3.9626 mg |
| $Na_2HPO_4 \cdot 7H_2O$ | 3.3021 mg |
| $Na_2MoO_4 \cdot 2H_2O$ | .9906 mg |
| Trace Elements | |
| LiCl | .9906 mg |
| $Ca(C_6H_{11}O_7)_2$ | .0604 mg |
| KI | .0951 mg |
| KBr | 28.5370 mg |
| Cu as Chloride | .0018 mg |
| Al as Sulfate | .0032 mg |
| Co as Sulfate | .0201 mg |
| Rb as Sulfate | .1120 mg |
| Zn as Sulfate | .0159 mg |
| Fe as Sulfate | .0233 mg |

The electrical conductivity and the flux of the purified effluent were measured and the test results were reported in percent salt rejection and flux in gallons per square foot per day (gfd). The reverse osmosis test line which is used in the laboratory was a bench scale system equipped for flat cells. It included a feed reservoir, high pressure piston pump, surge tank (accumulator), constant temperature bath, a bank of test cells, line pressure control valve, flow meter, and a safety shut off device. Pressure in the test line was maintained using nitrogen gas.

TABLE I

| Flux and Salt Rejection of Membranes | | |
|---|---|---|
| Membrane of Example | Average Flux (gfd) | Average Rejection (wt %) |
| V | 9.1 | 92.0 |
| VI | 4.4 | 90.5 |
| VII | 9.9 | 94.8 |
| VIII | 9.5 | 92.6 |
| IX | 6.6 | 96.0 |
| X | 9.2 | 95.1 |
| XI | 3.7 | 96.7 |
| XII | 6.5 | 92.7 |
| XIII | 8.7 | 93.7 |
| XIV | 6.7 | 94.5 |
| XV | 7.3 | 93.5 |
| XVI | 13.6 | 78.0 |
| XVII | 9.8 | 90.0 |

TABLE I-continued

Flux and Salt Rejection of Membranes

| Membrane of Example | Average Flux (gfd) | Average Rejection (wt %) |
|---|---|---|
| XVIII | 2.7 | 72.0 |
| XIX | 6.3 | 95.4 |
| XX | 13.5 | 91.2 |

TABLE II

Membranes Made in the Presence of Additives

| Membrane of Example (Additive) | Average Flux (gfd) | Average Rejection (wt-%) %) |
|---|---|---|
| XXI (2% Na$_3$PO$_4$.12H$_2$O 0.5% SLS) | 3.0 | 98.8 |
| XXII (1% piperazine 2% Na$_3$PO$_4$.12H$_2$O) | 10.0 | 93.4 |
| XXIII (1% piperazine 0.5% SLS) | 12.4 | 94.9 |
| XXIV (0.5% piperazine 0.5% SLS) | 15.3 | 94.2 |

CHLORINE STABILITY

The membranes prepared in the Examples were tested for chlorine stability and exhibited substantial oxidative stability.

| | Reverse Osmosis Test Data | | | |
|---|---|---|---|---|
| | Average Flux (gfd) | | Average Rejection % | |
| Membrane | Before Chlorine Exposure | After Chlorine Exposure | Before Chlorine Exposure | After Chlorine Exposure |
| XXVI | 3.8 | 5.2 | 93.3 | 93.4 |
| XXVII | 3.0 | 2.2 | 92.3 | 94.4 |

Flux tested at 8 atm. with 3.5% synthetic seawater for 24 hours at 25° C.

Membranes soaked in water for 48 hours before chlorine exposure.

Membranes soaked in 100 ppm chlorine water for 48 hours during exposure.

The above data show that the membranes made from a polymerized 1,3-diamino-2-hydroxypropane-epichlorohydrin adduct crosslinked with di- and tricarboxylic acid compounds provide excellent salt rejection on the range of 90 to 98 wt-% and flux values that range between 3 and 15 gfd. The above Tables additionally show that the flux and rejection characteristics of the membranes can also be improved using inorganic compound additives and organic surfactant additives. The foregoing description, examples, and data are illustrative of the invention, and should not be used to unduly limit the scope of the invention.

In view of the many embodiments and variations which can be used in preparing membranes of the invention, the invention resides wholly in the claims hereinafter appended.

We claim:

1. A semi-permeable crosslinked polymeric membrane having adequate flux and solute rejection and a resistance to oxidative degradation which comprises the reaction product of a di- or trifunctional aromatic carboxylic acid compound, that is reactive with amine or hydroxy groups, selected from the group consisting of aromatic carboxylic acid halides and aromatic carboxylic acid anhydrides; and a polymerized adduct of a polyamine compound of the formula, NH$_2$—(A—NH-)$_n$—H, wherein A is a C$_{6-18}$ arylene or a C$_{2-6}$ alkylene and n is an integer of 1-6 or, NH$_2$—(B—NH)$_n$—H wherein B is

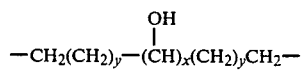

or, NH$_2$—(B—NH)$_n$—H wherein B is $$-CH_2(CH_2)_y-(CH)_x(CH_2)_yCH_2-$$
$$\quad\quad\quad\quad\quad |$$
$$\quad\quad\quad\quad\quad OH$$

n, x and y are independently an integer of 0-6 and n+x+y is greater than or equal to 2; and an epihalohydrin compound of the formula:

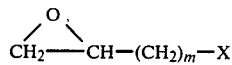

wherein X is halogen and m is an integer of 1 to 6.

2. A cartridge used in reverse osmosis membrane apparatus which comprises an outer shell, a fluid inlet, a fluid outlet and the membrane of claim 1 wherein the fluid inlet is separated from the fluid outlet by the membrane.

3. A method for the desalinization of sea water which comprises contacting water having high salinity with the semi-permeable membrane of claim 1 under conditions of high pressure resulting in flux of purified water through the membrane and the rejection of salinity by the membrane.

4. The semi-permeable membrane of claim 1 wherein the aromatic carboxylic acid compound comprises a compound having the formula:

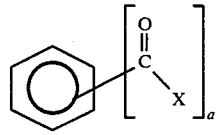

wherein X is halogen and a is an integer of 2-4.

5. The semi-permeable membrane of claim 4 wherein the aromatic carboxylic acid compound is an aromatic dicarboxylic acid halide compound.

6. The semi-permeable membrane of claim 4 wherein the aromatic carboxylic acid compound comprises phthaloyl chloride, isophthaloyl chloride, trimesoyl chloride, or mixtures thereof.

7. The semi-permeable membrane of claim 1 wherein the epihalohydrin comprises 3-chloro-1,2-epoxy propane.

8. The semi-permeable membrane of claim 1 wherein the polymerized adduct has the following formula:

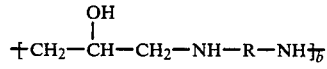

wherein b is an integer of 10-20 and R is —(A—NH—)$_{n-1}$—A— or —(B—NH)$_{n-1}$—B—.

9. The semi-permeable membrane of claim 1 which comprises the reaction product of an isophthalic acid chloride, trimesoyl acid chloride, or mixtures thereof and polymerized adduct of 1,3-diamino-2-hydroxypropane and 3-chloro-1,2-epoxypropane.

10. The semi-permeable membrane of claim 1 wherein the reaction product is formed in the presence of an effective amount of an inorganic salt compound.

11. The semi-permeable membrane of claim 10 wherein the inorganic salt is a sodium phosphate compound.

12. The semi-permeable membrane of claim 1 wherein the reaction product is formed in the presence of a surfactant.

13. The semi-permeable membrane of claim 12 wherein the surfactant is an anionic surfactant.

14. The semi-permeable membrane of claim 13 wherein the anionic surfactant is a linear alkyl sulfonate surfactant.

15. A method for making a semi-permeable crosslinked polymeric membrane having adequate flux, solute rejection and resistance to oxidative degradation which comprises:
(a) reacting in a suitable solvent, a polyamine compound of the following formula:

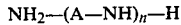
NH$_2$—(A—NH)$_n$—H wherein A is a C$_{6\text{-}18}$ arylene or a C$_{2\text{-}6}$ alkylene and n is an integer of 1–6 or, NH$_2$—(B—NH)$_n$—H wherein B is or, NH$_2$—(B—NH)$_n$—H wherein B is

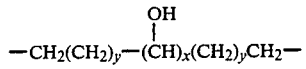
$$\underset{\phantom{xx}}{-CH_2(CH_2)_y-\overset{\overset{OH}{|}}{(CH)}_x(CH_2)_yCH_2-}$$

n, x and y are independently an integer of 0–6 and n+x+y is greater than or equal to 2; and an epihalohydrin compound of the formula:

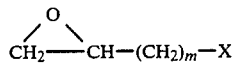
$$\overset{O}{\overset{/\ \ \backslash}{CH_2\text{---}CH}}-(CH_2)_m-X$$

wherein X is halogen and m is an integer of 1–6, to form a polymerized adduct; and (b) reacting in a flexible support a sufficient amount of the polymerized adduct to form a membrane with a sufficient amount of an aromatic di- or trifunctional carboxylic acid compound selected from the group consisting of carboxylic acid halides and carboxylic acid anhydrides having amine or hydroxyl reactive carboxyl groups, to crosslink the adduct to form the membrane.

16. The method of claim 15 wherein the aromatic carboxylic acid compound comprises a compound having the formula:

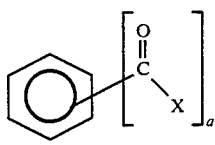

wherein X is halogen and a is an integer of 2–4.

17. The method of claim 16 wherein the aromatic carboxylic acid compound is an aromatic dicarboxylic acid halide compound.

18. The method of claim 17 wherein the aromatic carboxylic acid compound comprises phthaloyl chloride, isophthaloyl chloride, trimesoyl chloride, or mixtures thereof.

19. The method of claim 16 wherein the epihalohydrin comprises 3-chloro-1,2-epoxy propane.

20. The method of claim 16 wherein the polymerized adduct has the following formula:

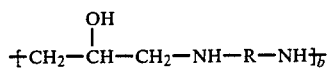
$$+CH_2-\overset{\overset{OH}{|}}{CH}-CH_2-NH-R-NH+_b$$

wherein b is an integer of 10–20 and R is —(A—NH—)$_{n-1}$—A— or —(B—NH)$_{n-1}$—B—.

21. The method of claim 16 which comprises the reaction product of an isophthalic acid chloride, trimesoyl acid chloride, or mixtures thereof and polymerized adduct of 1,3-diamino-2-hydroxypropane and 3-chloro-1,2-epoxypropane.

22. The method of claim 16 wherein the reaction product is formed in the presence of an effective amount of an inorganic salt compound.

23. The method of claim 22 wherein the inorganic salt is a sodium phosphate.

24. The method of claim 16 wherein the reaction product is formed in the presence of a surfactant.

25. The method of claim 24 wherein the surfactant is an anionic surfactant.

26. The method of claim 25 wherein the anionic surfactant is a linear alkyl sulfonate surfactant.

27. A semi-permeable crosslinked polymeric membrane having adequate flux, solute rejection and resistance to oxidative degradation which comprises the reaction product of isophthaloyl chloride and a polymerized adduct comprising the reaction product of 1,3-diamino-2-hydroxypropane and 3-chloro-1,2-epoxy propane.

* * * * *

UNITED STATES PATENT AND TRADEMARK OFFICE
CERTIFICATE OF CORRECTION

PATENT NO. : 4,659,475
DATED : April 21, 1987
INVENTOR(S) : Tsung K. Liao et al

It is certified that error appears in the above-identified patent and that said Letters Patent is hereby corrected as shown below:

Column 17, line 14, "(wt -%)%)" should read -- (wt -%) --.

Column 18, line 8, delete "or, $NH_2-(B-NH)_n-H$ wherein B is".

Column 19, line 31, delete "or, $NH_2-(B-NH)_n-H$ wherein B is".

Column 20, line 13, "16" should read --15--.

Column 20, line 20, "16" should read --15--.

Column 20, line 22, "16" should read --15--.

Column 20 line 31, "16" should read --15--.

Column 20, line 36, "16" should read --15--.

Column 20, line 41, "16" should read --15--.

Signed and Sealed this

Eighteenth Day of August, 1987

*Attest:*

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,659,475
DATED : April 21, 1987
INVENTOR(S) : Tsung K. Liao and Cecil B. Chappelow It is certified that error appears in the above-identified patent and that said Letters Patent is hereby corrected as shown below:

Claims 1 and 15 of the patent should read as follows:

1. A semi-permeable crosslinked polymeric membrane having adequate flux and solute rejection and a resistance to oxidative degradation which comprises the reaction product of a di- or trifunctional aromatic carboxylic acid compound, that is reactive with amine or hydroxy groups, selected from the group consisting of aromatic carboxylic acid halides and aromatic carboxylic acid anhydrides; and a polymerized adduct of a polyamine compound of the formula, $NH_2-(A-NH)_n-H$ wherein A is a $C_{6-18}$ arylene or a $C_{2-6}$ alkylene and n is an integer of 1-6 or, $NH_2-(B-NH)_n-H$ wherein B is n, x and y are independently an integer of 0-6 and n+x+y is greater than or equal to 2; and an epihalohydrin compound of the formula:

UNITED STATES PATENT AND TRADEMARK OFFICE
CERTIFICATE OF CORRECTION

PATENT NO. : 4,659,475

DATED : April 21, 1987

INVENTOR(S) : Tsung K. Liao and Cecil B. Chappelow

It is certified that error appears in the above-identified patent and that said Letters Patent is hereby corrected as shown below:

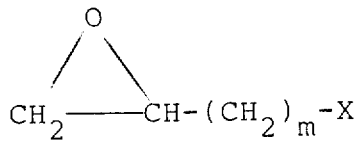

wherein X is halogen and m is an integer of 1 to 6.

15. A method for making a semi-permeable crosslinked polymeric membrane having adequate flux, solute rejection and resistance to oxidative degradation which comprises:

(a) reacting in a suitable solvent, a polyamine compound of the following formula:

$NH_2-(A-NH)_n-H$ wherein A is a $C_{6-18}$ arylene or a $C_{2-6}$ alkylene and n is an integer of 1-6 or, $NH_2-(B-NH)_n-H$ wherein B is $-CH_2(CH_2)_y-(CH)_x(CH_2)_yCH_2-$ with OH on the (CH)

n, x and y are independently an integer of 0-6 and n+x+y is greater than or equal to 2; and an epihalohydrin compound of the formula:

UNITED STATES PATENT AND TRADEMARK OFFICE
CERTIFICATE OF CORRECTION

PATENT NO. : 4,659,475

DATED : April 21, 1987

INVENTOR(S) : Tsung K. Liao and Cecil B. Chappelow

It is certified that error appears in the above-identified patent and that said Letters Patent is hereby corrected as shown below:

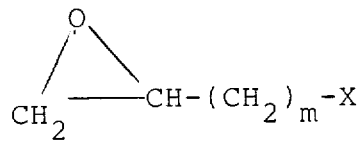

wherein X is halogen and m is an integer of 1-6, to form a polymerized adduct; and (b) reacting in a flexible support a sufficient amount of the polymerized adduct to form a membrane with a sufficient amount of an aromatic di- or trifunctional carboxylic acid compound selected from the group consisting of carboxylic acid halides and carboxylic acid anhydrides having amine or hydroxyl reactive carboxyl groups, to crosslink the adduct to

UNITED STATES PATENT AND TRADEMARK OFFICE
CERTIFICATE OF CORRECTION

PATENT NO. : 4,659,475

DATED : April 21, 1987

INVENTOR(S) : Tsung K. Liao and Cecil B. Chappelow

It is certified that error appears in the above-identified patent and that said Letters Patent is hereby corrected as shown below:

form the membrane.

Signed and Sealed this

Sixth Day of June, 1989

Attest:

DONALD J. QUIGG

Attesting Officer

Commissioner of Patents and Trademarks